United States Patent
Ma et al.

(10) Patent No.: US 12,103,630 B2
(45) Date of Patent: Oct. 1, 2024

(54) SCOOTER

(71) Applicant: Ninebot (Changzhou) Tech Co., Ltd., Jiangsu (CN)

(72) Inventors: Yao Ma, Jiangsu (CN); Can Wang, Jiangsu (CN)

(73) Assignee: NINEBOT (CHANGZHOU) TECH CO., LTD., Jiangsu (CN)

( * ) Notice: Subject to any disclaimer, the term of this patent is extended or adjusted under 35 U.S.C. 154(b) by 348 days.

(21) Appl. No.: 17/583,849

(22) Filed: Jan. 25, 2022

(65) Prior Publication Data

US 2022/0274667 A1  Sep. 1, 2022

(30) Foreign Application Priority Data

Mar. 1, 2021 (CN) .................. 202120446064.X

(51) Int. Cl.
*B62K 19/08* (2006.01)
*B62J 43/28* (2020.01)
*B62K 3/00* (2006.01)

(52) U.S. Cl.
CPC ............... *B62K 19/08* (2013.01); *B62J 43/28* (2020.02); *B62K 3/002* (2013.01)

(58) Field of Classification Search
CPC ........ B62K 19/08; B62K 3/002; B62K 19/04; B62K 19/30; B62K 19/38; B62J 43/28; B62J 43/13
See application file for complete search history.

(56) References Cited

U.S. PATENT DOCUMENTS

| | | | | |
|---|---|---|---|---|
| 4,799,701 A | * | 1/1989 | Lindau | B62K 3/002 188/74 |
| 6,619,679 B2 | * | 9/2003 | Lan | B62K 3/002 180/181 |
| 2001/0011202 A1 | * | 8/2001 | Yamawaki | B62K 3/002 701/93 |
| 2005/0236803 A1 | * | 10/2005 | Summers | B62K 5/05 280/282 |
| 2012/0061931 A1 | * | 3/2012 | Floyd | B62K 3/002 188/19 |
| 2013/0020142 A1 | * | 1/2013 | Kim | B62H 1/00 180/205.1 |
| 2020/0183403 A1 | * | 6/2020 | Xi | B62K 17/00 |

FOREIGN PATENT DOCUMENTS

| | | | |
|---|---|---|---|
| CN | 2433167 Y | * | 6/2001 |
| CN | 202863656 U | | 4/2013 |
| CN | 103072660 A | * | 5/2013 |
| CN | 203601483 U | * | 5/2014 |
| CN | 210063206 U | | 2/2020 |
| CN | 210822624 U | * | 6/2020 |
| CN | 211568222 U | * | 9/2020 |
| CN | 214165205 U | * | 9/2021 |
| DE | 102019211194 A1 | * | 1/2021 |
| DE | 102021105199 A1 | * | 9/2022 |
| KR | 20020065260 A | | 8/2002 |

OTHER PUBLICATIONS

Extended European Search Report dated Jul. 20, 2022, for corresponding European Application No. 22151328.6.

* cited by examiner

*Primary Examiner* — James A Shriver, II
*Assistant Examiner* — Michael T. Walsh
(74) *Attorney, Agent, or Firm* — David D. Brush; Westman, Champlin & Koehler, P.A.

(57) ABSTRACT

A scooter including a frame and a casing. The casing covers an outer peripheral side of the frame and is made of plastics.

18 Claims, 3 Drawing Sheets

SCOOTER

CROSS-REFERENCE TO RELATED APPLICATION

This application is based on and claims priority to Chinese Application No. 202120446064.X, filed on Mar. 1, 2021, the entire contents of which are incorporated herein by reference for all purposes.

FIELD

The present disclosure relates to the field of scooters, and more particularly, to a scooter.

BACKGROUND

In the related art, frames of scooters are usually formed by welding or riveting using tube or plate profiles, aluminum-magnesium alloy, or the like, and then are subjected to appearance treatment to achieve effects of rust removal and beautification. However, processing standards for such frame are raised to a certain extent, thus increasing cost, and the above-mentioned frames have poor waterproof performance. The appearances of scooters are prone to being restricted by material characteristics and costs of the frames, causing the scooters on the market nowadays to be largely identical with minor differences in appearance.

SUMMARY

A scooter according to embodiments of the present disclosure includes: a frame; and a casing covering an outer peripheral side of the frame and made of plastics.

Another scooter according to embodiments of the present disclosure includes: a first frame member and a second frame member spaced apart in a left-right direction; a connecting member coupled between the first frame member and the second frame member, an accommodation space being defined between the connecting member and the first frame member and the second frame member; a housing covering outer surfaces of the first frame member, the second frame member and the connecting member; and a cover coupled to the housing and closing an open side of the accommodation space.

BRIEF DESCRIPTION OF THE DRAWINGS

The above and/or additional aspects and advantages of the present disclosure will become apparent and more readily appreciated from the following descriptions made with reference to the drawings, in which.

DETAILED DESCRIPTION

Figure 1:
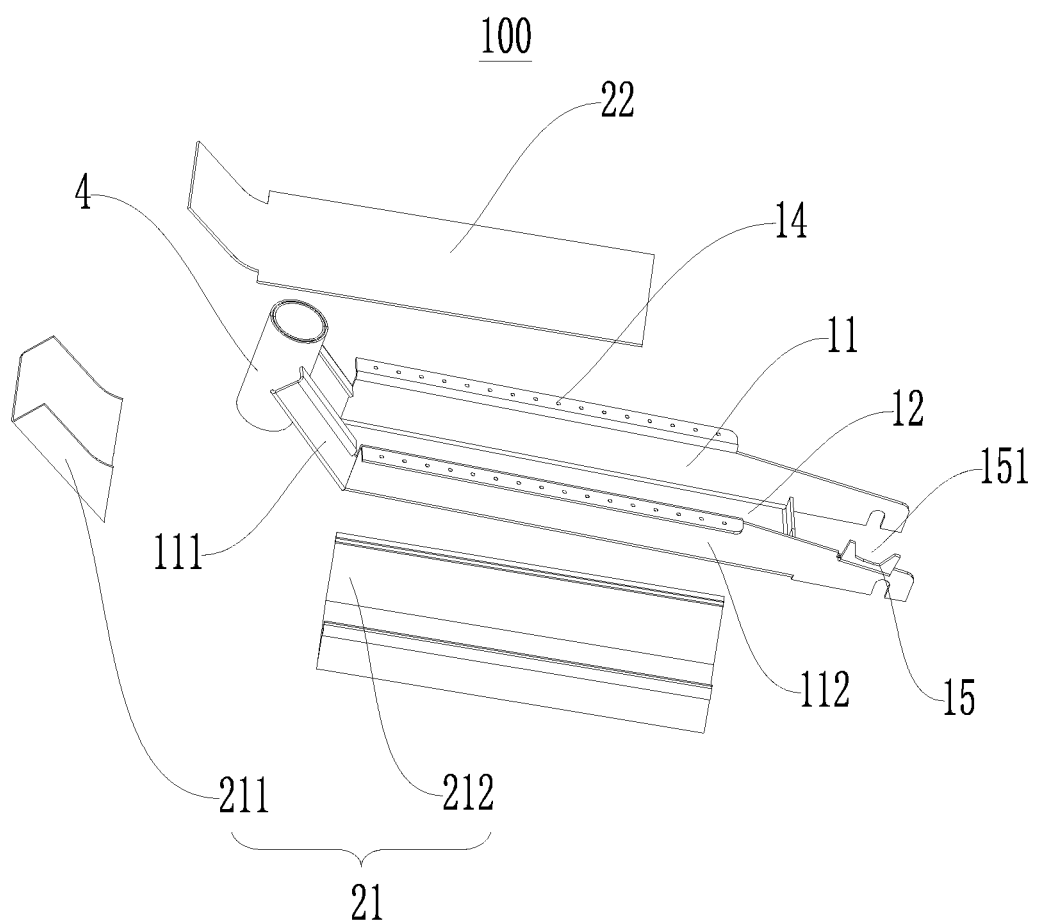
FIG. 1 is an exploded view of a frame and a casing of a scooter according to an embodiment of the present disclosure.

A scooter 100 according to embodiments of the present disclosure will be described below with reference to FIGS. 1 to 4. In the following description of the present disclosure, the scooter 100 is exemplified as an electric scooter for illustration. It can be understood by those skilled in the art that the scooter 100 may also be configured as other types of scooters rather than limited to the electric scooter.

As shown in FIGS. 1 to 4, the scooter 100, such as the electric scooter, according to the embodiments of the present disclosure includes a frame 1 and a casing 2.

Specifically, the casing 2 covers an outer peripheral side of the frame 1, such that the casing 2 can effectively isolate the frame 1 from the outside, avoiding phenomena such as corrosion after long-term use of the frame 1, improving waterproof performance of the frame 1, and thus prolonging the service life of the frame 1. The casing 2 is a plastic part. Compared with traditional scooters, the plastic casing 2 can achieve a wide range of coverage of the frame 1, improving integrity of the scooter 100 and an overall visual effect of the scooter 100. Meanwhile, the plastic casing 2 is easier to form than a metal casing or an alloy casing, which can facilitate appearance design of the scooter 100 to enable the scooter 100 to have a more characteristic and attractive appearance. Furthermore, the plastic part can be produced with high efficiency and low cost, thereby reducing the cost of the scooter 100.

For the scooter 100, such as the electric scooter, according to the embodiments of the present disclosure, since the casing 2 is made of plastics and covers the outer peripheral side of the frame 1, the waterproof performance and integrity of the scooter 100 can be effectively improved, the appearance design of the scooter 100 can be facilitated to enable the scooter 100 to have a more characteristic and attractive appearance, the production efficiency can be enhanced, and the cost can be reduced.

According to some embodiments of the present disclosure, the frame 1 is a sheet metal part. For example, the frame 1 may be made of sheet metal having a thickness of less than or equal to 6 mm through shearing, bending, welding and other sheet metal processes. Compared with frames of the traditional scooters, this arrangement can lower the processing standard for the frame 1 to a certain extent while ensuring the basic performance of the frame 1, such as structural strength, to make the processing of the frame 1 simple and convenient and further reduce the cost of the scooter 100.

According to some embodiments of the present disclosure, the frame 1 includes: two frame members 11 spaced apart in a left-right direction; and a connecting member 12 coupled between the two frame members 11. An accommodation space 13 is defined between the connecting member 12 and the two frame members 11, and at least one of a battery 3 and a controller (not shown) of the scooter 100 is arranged in the accommodation space 13. For example, in some examples of FIGS. 1 to 4, the two frame members 11 are coupled to both sides of the connecting member 12 in a width direction respectively, and extend perpendicularly to the connecting member 12 and in a direction away from the connecting member 12. Thus, the space between the two frame members 11 and the connecting member 12 can be utilized effectively, to make the structure of the scooter 100 more compact and facilitate a miniaturization design of the scooter 100. Meanwhile, the frame 1 may also be used as a mounting carrier to mount other components of the scooter 100.

Figure 2:
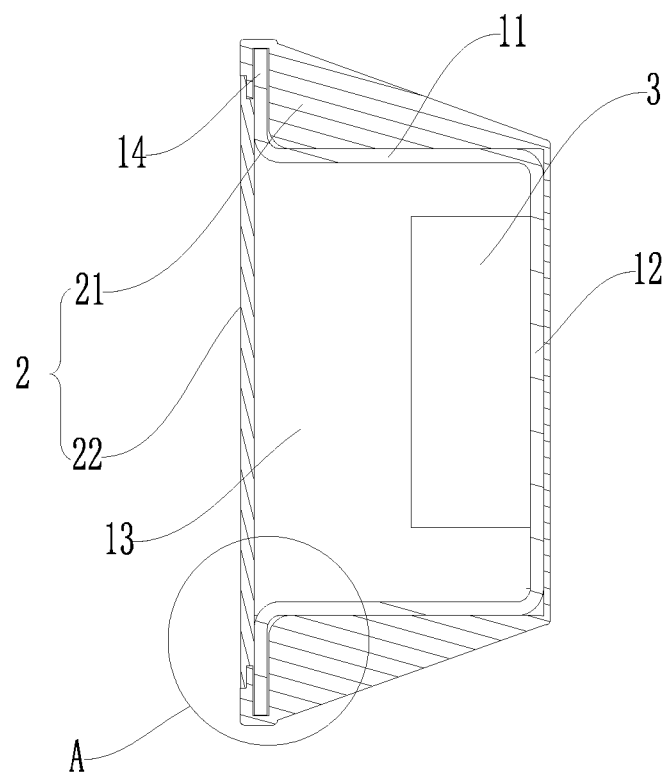
FIG. 2 is a sectional view of a frame, a casing, and a power source of a scooter according to an embodiment of the present disclosure.

It is possible that only the battery 3 is arranged in the accommodation space 13 and fixedly coupled to the connecting member 12 (as shown in FIG. 2), or only the controller is arranged in the accommodation space 13 and fixedly coupled to the connecting member 12 (not shown), or the battery 3 and the controller are both arranged in the accommodation space 13 and fixedly coupled to the connecting member 12 (not shown). Further, sponge or foam may be filled between an inner wall of the accommodation space 13 and the battery 3 and the controller, to further limit the positions of the battery 3 and the controller, and guarantee the stability of the battery 3 and the controller in the accommodation space 13.

Further, the connecting member 12 is coupled to respective tops or bottoms of the two frame members 11. The connecting member 12 may be coupled to the tops of the two frame members 11 (not shown), and in such a case, an open side of the accommodation space 13 faces downwards, which can effectively enhance the waterproof performance of the scooter 100 and prevent water from flowing into the accommodation space 13. Alternatively, the connecting member 12 may be coupled to the bottoms of the two frame members 11 (as shown in FIG. 2), and in such a case, an open side of the accommodation space 13 faces upwards, to facilitate the mounting of the battery 3 and the controller and to improve the assembly efficiency of the scooter 100.

Figure 4:
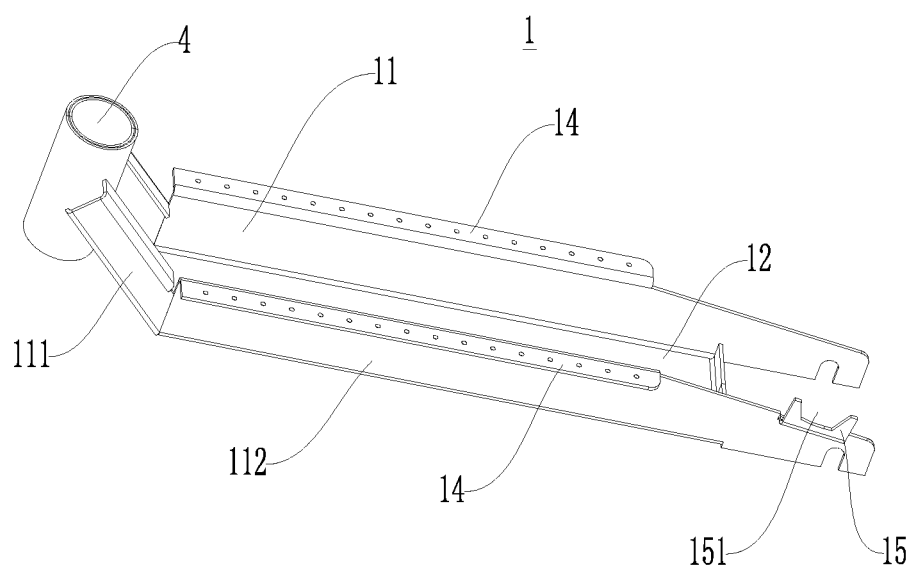
FIG. 4 is a schematic view of a frame of a scooter according to an embodiment of the present disclosure.

In some embodiments, each frame member 11 is provided with a reinforcing member 14. Referring to FIGS. 1 and 4, the reinforcing member 14 may be arranged on a side of the corresponding frame member 11 away from the connecting member 12, and extend in a direction away from a center of the accommodation space 13. For example, the reinforcing member 14 may be formed in such a way that a part of the side of the corresponding frame member 11 away from the connecting member 12 is directly bent outwards. This arrangement can effectively enhance the structural strength of the whole frame 1. Meanwhile, the casing 2 and a pedal of the scooter 100 may be mounted on the frame 1 by the reinforcing members 14. For example, the casing 2 and the pedal may be coupled to the reinforcing members 14 by means of snaps, a screws, or the like.

According to further embodiments of the present disclosure, one of the two frame members 11 is provided with a brake mounting plate 15. For instance, in the examples of FIGS. 1 and 4, the brake mounting plate 15 may be arranged on the side of one of the two frame members 11 away from the connecting member 12, and formed by directly bending a part of the corresponding frame member 11. For example, the brake mounting plate 15 may first extend horizontally in a direction away from the center of the accommodation space 13 and then extend upwards. An opening 151 is formed in the brake mounting plate 15 and may be trapezoidal. A brake device of the scooter 100 may be mounted on the brake mounting plate 15 through the opening 151.

According to some embodiments of the present disclosure, the casing 2 includes a housing 21 and a cover 22. The housing 21 covers outer surfaces of the two frame members 11 and the connecting member 12. The cover 22 is coupled to the housing 21 and closes the open side of the accommodation space 13. For instance, in the example of FIG. 1, each frame member 11 includes a first frame section 111 and a second frame section 112; the first frame section 111 has a first end coupled to the second frame section 112 and a second end coupled to a head tube 4 of the scooter 100; and the head tube 4 is configured to mount a steering device of the scooter 100. The housing 21 may include a first housing portion 211 and a second housing portion 212; the first housing portion 211 covers front outer surfaces of the two first frame sections 111 and the connecting member 12; the second housing portion 212 covers outer peripheral surfaces of the two second frame sections 112 and the connecting member 12. The cover 22 may be coupled to open sides of the first housing portion 211 and the second housing portion 212 by means of snaps, screws, or the like. For example, the cover 22 and the housing 21 may be both coupled to the reinforcing members 14, such that the casing 2 can reliably cover the outer peripheral side of the frame 1. The cover 22 can close the open side of the accommodation space 13, such that the battery 3 and the controller may be located in a closed environment, which can effectively prevent dust and water from entering the accommodation space 13, and guarantee cleanness in the accommodation space 13, to prolong the service life of the battery 3 and the controller.

In some embodiments, a part of the housing 21 corresponding to the two frame members 11 has a cross sectional area gradually increased from bottom to top. For example, in the example of FIG. 2, the cross sectional area of the part of the housing 21 corresponding to the two frame members 11 is gradually increased in a direction from the connecting member 12 to the reinforcing members 14. This arrangement can effectively improve the structural strength of the housing 21, and effectively enlarge a mounting area for the pedal to guarantee the stability of mounting the pedal. The pedal with a large area may be arranged on the scooter 100, thereby increasing a contact area between the pedal and feet of a user and improving the stability of driving the scooter 100.

Figure 3:
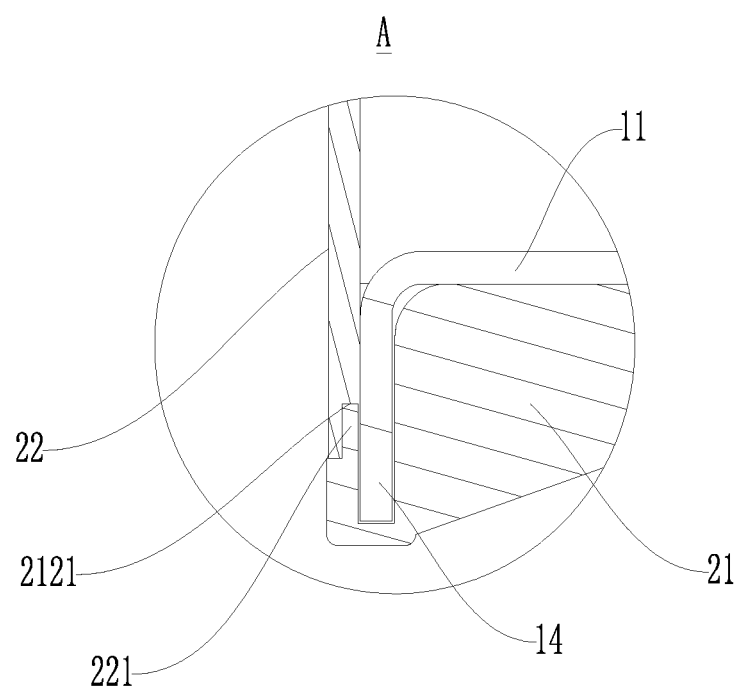
FIG. 3 is an enlarged view of portion A circled in FIG. 2.

In some embodiments, a groove 2121 is formed in the housing 21, and a protrusion 221 is formed on the cover 22 and fitted in the groove 2121 to form an S-shaped seal between the housing 21 and the cover 22. Referring to FIGS. 2 and 3, a groove 2121 is formed in an edge of an upper surface of the housing 21 and recessed downwards, and the groove 2121 runs through a side surface of the housing 21 facing the accommodation space 13. The protrusion 221 extending towards the housing 21 is formed on a side of the cover 22 away from the frame member 11. During mounting, the protrusion 221 is fitted in the corresponding groove 2121 to realize sealed connection between the cover 22 and the housing 21. This arrangement can effectively guarantee sealing performance at a junction between the cover 22 and the housing 21, and effectively prevent rainwater or snow water from entering the accommodation space 13, to further guarantee the cleanness in the accommodation space 13, and further prolong the service life of the battery 3 and the controller.

Other configurations and operations of the scooter 100, such as the electric scooter, according to the embodiments of the present disclosure are known to those skilled in the art and will not be described in detail herein.

In the description of the present disclosure, it is to be understood that terms such as "length," "width," "thickness," "upper," "lower," "front," "rear," "left," "right," "top," "bottom," "inner" and "outer" should be construed to refer to the orientation as shown in the drawings. These relative terms are for convenience of description and do not require that the present disclosure have a particular orientation or be constructed and operated in a particular orientation. Thus, these terms shall not be construed to limit the present disclosure.

In the description of the present disclosure, it should be noted that unless specified or limited otherwise, the terms "mounted," "connected," and "coupled" are used broadly, and may be, for example, fixed connections, detachable connections, or integral connections; may be direct connections or indirect connections via intervening structures; may also be communication of two elements. The above terms can be understood by those skilled in the art according to specific situations.

In the description of the present specification, reference throughout this specification to "an embodiment," "some embodiments," "an exemplary embodiment," "an example," "a specific example" or "some examples" means that a particular feature, structure, material, or characteristic described in connection with the embodiment or example is included in at least one embodiment or example of the present disclosure. In the specification, the appearances of the above terms are not necessarily referring to the same embodiment or example.

Although embodiments of the present disclosure have been shown and illustrated, it shall be understood by those skilled in the art that various changes, modifications, alternatives and variants can be made in the embodiments without departing from the principle and purpose of the present disclosure. The scope of the present disclosure is defined by the claims and their equivalents.

What is claimed is:

1. A scooter, comprising:
a frame; and
a casing covering an outer peripheral side of the frame and made of plastics;
wherein the frame comprises first and second frame members spaced apart in a left-right direction and a connecting member, each of the first and second frame members is provided with a reinforcing member;
the casing comprises a housing covering outer surfaces of the first and second frame members and the connecting member; and a cover coupled to the housing and closing an open side of an accommodation space; and
the cover and the housing are both coupled to the reinforcing members, such that the casing can reliably cover the outer peripheral side of the frame and a closed environment is formed.

2. The scooter according to claim 1, wherein the frame is a sheet metal part.

3. The scooter according to claim 1, wherein the connecting member is coupled between the first and second frame members, the accommodation space is defined between the connecting member and the first and second frame members, and at least one of a battery and a controller of the scooter is arranged in the accommodation space.

4. The scooter according to claim 3, wherein the connecting member is coupled to tops or bottoms of the first and second frame members.

5. The scooter according to claim 1, wherein the reinforcing member is arranged on a side of the corresponding frame member away from the connecting member.

6. The scooter according to claim 3, wherein one of the first and second frame members is provided with a brake mounting plate.

7. The scooter according to claim 1, wherein a part of the housing corresponding to the first and second frame members has a cross sectional area increased gradually from bottom to top.

8. The scooter according to claim 1, wherein a groove is formed in the housing, and a protrusion is formed on the cover and fitted in the groove to form an S-shaped seal between the housing and the cover.

9. A scooter, comprising:
a first frame member and a second frame member spaced apart in a left-right direction;
a connecting member coupled between the first frame member and the second frame member, an accommodation space being defined between the connecting member and the first frame member and the second frame member;
a housing covering outer surfaces of the first frame member, the second frame member and the connecting member; and
a cover coupled to the housing and closing an open side of the accommodation space;
wherein each of the first frame member and the second frame member is provided with a reinforcing member, the cover and the housing are both coupled to the reinforcing members, such that the cover and the housing can reliably cover outer peripheral sides of the first frame member and the second frame member and a closed environment is formed.

10. The scooter according to claim 9, wherein each of the first frame member and the second frame member comprises a first frame section and a second frame section; and the first frame section has a first end coupled to the second frame section and a second end coupled to a head tube of the scooter.

11. The scooter according to claim 9, wherein the housing comprises:
a first housing portion covering front outer surfaces of the first frame member, the second frame member and the connecting member; and
a second housing portion covering outer peripheral surfaces of the first frame member, the second frame member and the connecting member.

12. The scooter according to claim 11, wherein the cover is coupled to open sides of the first housing portion and the second housing portion.

13. The scooter according to claim 9, wherein each of the first frame member and the second frame member is made of sheet metal having a thickness of less than or equal to 6 mm.

14. The scooter according to claim 9, wherein a battery is arranged in the accommodation space, and sponge or foam is filled between an inner wall of the accommodation space and the battery.

15. The scooter according to claim 9, wherein the reinforcing member is formed in such a way that a part of a side, away from the connecting member, of each of the first frame member and the second frame member is directly bent outwards.

16. The scooter according to claim 9, wherein a brake mounting plate is formed in such a way that a part of a side, away from the connecting member, one of the first frame member and the second frame member is directly bent.

17. The scooter according to claim 16, wherein the brake mounting plate extends horizontally in a direction away from a center of the accommodation space and then extends upwards.

18. The scooter according to claim 16, wherein an opening is formed in the brake mounting plate.

* * * * *